US011872717B2

(12) United States Patent
Johansen et al.

(10) Patent No.: US 11,872,717 B2
(45) Date of Patent: Jan. 16, 2024

(54) SWIVEL KNIFE HOLDER ASSEMBLY FOR A MULTI-PLY RECIPROCATING CUTTER

(71) Applicant: Gerber Technology LLC, Tolland, CT (US)

(72) Inventors: Mark R. Johansen, Tolland, CT (US); Darryl C. Stein, Tolland, CT (US); James Loos, Tolland, CT (US)

(73) Assignee: Gerber Technology LLC, Tolland, CT (US)

( * ) Notice: Subject to any disclaimer, the term of this patent is extended or adjusted under 35 U.S.C. 154(b) by 1 day.

(21) Appl. No.: 17/856,727

(22) Filed: Jul. 1, 2022

(65) Prior Publication Data

US 2023/0001598 A1 Jan. 5, 2023

Related U.S. Application Data

(60) Provisional application No. 63/217,565, filed on Jul. 1, 2021.

(51) Int. Cl.
*B26D 7/00* (2006.01)
*B26D 5/00* (2006.01)

(52) U.S. Cl.
CPC ............... *B26D 7/00* (2013.01); *B26D 5/005* (2013.01); *B26D 2007/005* (2013.01)

(58) Field of Classification Search
CPC .... B26D 7/00; B26D 5/005; B26D 2007/005; B26D 2007/2678; B26D 7/2164; Y10T 83/8776
See application file for complete search history.

(56) References Cited

U.S. PATENT DOCUMENTS

| | | | |
|---|---|---|---|
| 4,574,673 | A | 3/1986 | Pearl |
| 6,209,208 | B1 | 4/2001 | Marinkovich et al. |
| 6,360,639 | B1 | 3/2002 | Gerber |
| 8,919,787 | B1 | 12/2014 | Wilcher |
| 2005/0039340 | A1 | 2/2005 | Bigden et al. |
| 2010/0111622 | A1 | 5/2010 | Puschmann-Frenken |

(Continued)

OTHER PUBLICATIONS

International Search Report and Written Opinion in corresponding International Application No. PCT/US2022/035971, dated Oct. 5, 2022, 8 pages.

(Continued)

*Primary Examiner* — Evan H MacFarlane
*Assistant Examiner* — Liang Dong
(74) *Attorney, Agent, or Firm* — Day Pitney LLP; George N. Chaclas; Anthony A. Kassas

(57) ABSTRACT

The swivel knife holder assembly includes a shoulder screw defining an axis, and having a proximal threaded end and a distal head, and mounted on the shoulder screw is a bobbin assembly. The swivel knife holder assembly also includes a shell defining an interior, and having a distal opening and a proximal opening. A core is secured in the interior and is coupled to a knife for cutting fabric material. The proximal opening of the shell is defined by a flange and houses the shoulder screw therein. Threadably coupled to the proximal threaded end of the shoulder screw is a stem. The stem secures the bobbin assembly within the shell and also includes a mounting surface for engaging a reciprocating drive mechanism.

14 Claims, 11 Drawing Sheets

(56) References Cited

U.S. PATENT DOCUMENTS

| | | | | |
|---|---|---|---|---|
| 2012/0330449 | A1* | 12/2012 | Edwards | B26D 5/005 83/582 |
| 2014/0182442 | A1* | 7/2014 | Hortling | B26D 7/2621 83/698.41 |

OTHER PUBLICATIONS

Online Purchase Page for "Assy Swivel Square .078 Knife", https://estore.gerbertechnology.com/item-detail?itemId=51421&organizationId=11, Gerber Technology eStore, 2022, 1 page.

Online Purchase Page for "Swivel, Square, .093/.125,S-91/S-93-7", https://estore.gerbertechnology.com/item-detail?itemId=63189&organizationId=11, Gerber Technology eStore, 2022, 1 page.

* cited by examiner

SWIVEL KNIFE HOLDER ASSEMBLY FOR A MULTI-PLY RECIPROCATING CUTTER

RELATED APPLICATIONS

The present application claims the benefit of and priority to U.S. Provisional Patent Application 63/217,565 filed Jul. 1, 2021, the contents of which are incorporated by reference herein in their entirety for all purposes whatsoever.

BACKGROUND OF TIE DISCLOSURE

1. Field of the Disclosure

The present disclosure relates to computer numeric controlled (CNC) multi-ply cutting machines that uses a knife that reciprocates and rotates as a tool for cutting garment parts from multi-ply fabrics. More specifically, the present disclosure relates to a swivel assembly for the knife in a CNC multi-ply cutting machine.

2. Description of the Related Art

Computer numeric controlled machines may use a knife as a cutting tool for automated cutting of garment parts from stacked layers of fabric. An exemplary cutting tool for automated cutting of garment parts is disclosed in U.S. Pat. No. 6,360,639 to Gerber Technology, Inc. on Mar. 26, 2002, which is incorporated by reference herein in its entirety. A well-known usage of such a machine is the computer automation for precise cutting of multi-ply fabrics. Typically, a knife blade is positioned within a rotatable knife holder, and is operated by a crankshaft and a motor to cut a variety of intricate shapes from layers of fabric. Generally, the knife and knife holder are positioned within a cutter tube, and the knife holder and crankshaft are connected by a connecting rod. The knife holder and connecting rod are attached to each other by a swivel joint, which allows the knife and cutter tube to rotate while the connecting rod remains in a fixed orientation while reciprocating.

A drawback of prior art swivel assemblies is that the parts wear. As the parts wear, a significant amount of noise can occur due to reciprocating at high speeds such as 4,000 rpm. Furthermore, the mass of the swivel assembly subjects the components to significant forces resulting in the deformation and wear of these components. This also causes the quality of the fabric cut to degrade. As a result of the excessive noise and/or poor performance from worn components, the swivel assemblies are changed quite frequently.

In FIG. 1, a cutting machine 100 is illustrated including a cutter tube 112 for holding a reciprocating and rotating knife assembly 114. The knife assembly 114 vertically slides into and is held by the cutter tube 112. A theta motor 110 rotates the cutter tube 112, and thereby positions the knife of the knife assembly 114 into a desired orientation. The knife assembly 114 also couples to a twist joint 116 that reciprocates in a linear motion as driven by a Lanchester arrangement 102. The prior art relies on a heat treatment and nitride coating to control component wear and the level of noise.

SUMMARY OF THE DISCLOSURE

In view of the foregoing, there is a need in the art for a swivel joint assembly having a reduced level of force interaction to extend the longevity of the swivel joint and decrease noise output. It will be appreciated that the CNC multi-ply cutting machines used with the prior art may be retrofitted to employ a new swivel knife holder assembly in accordance with the present disclosure.

The objective of the disclosure is to provide a swivel assembly for a multi-ply cutter that reduces the level of noise output and overall wear and tear. The level of noise output is reduced through the reduction of radial and vertical clearance, which results in the reduction of overall backlash, chatter causing noise and wear.

In a preferred embodiment, the swivel knife holder assembly includes a shoulder screw defining an axis, and having a proximal threaded end and a distal head, and mounted on the shoulder screw is a bobbin assembly. The swivel knife holder assembly also includes a shell defining an interior, and having a distal opening and a proximal opening. A core is secured in the interior and is coupled to a knife for cutting fabric material. The proximal opening of the shell is defined by a flange and houses the shoulder screw therein. A stem threadably couples to the proximal threaded end of the shoulder screw. The stem secures the bobbin assembly within the shell and also includes a mounting surface for engaging a reciprocating drive mechanism.

Preferably, the bobbin assembly comprises a thrust bearing adjacent the distal head, a spacer for guiding the thrust bearing rotation, and a shock-absorbing member adjacent the spacer. The thrust bearing is pre-loaded with a compressive force applied by the flange by displacing the at least one shock-absorbing member. The compressive force should exceed an inertial force associated with a reciprocation of the knife. The shock-absorbing member is selected from the group consisting of a wave washer, coil spring, polymer disc, and combinations thereof. In one embodiment, the thrust bearing is anti-friction bearings having rolling elements, and the rolling elements can be at least one of a ball, cylindrical needle, and tapered pin. The knife holder can also include a top washer surrounding a base of the stem to provide additional support. In another embodiment, the flange segments the interior creating a first pocket between the distal head of the shoulder screw and the flange, and a second pocket between the flange and the base of the stem with a first bobbin assembly in the first segment and a second bobbin assembly in the second segment. The core can be secured to the shell by any means such as a screw, a pin or adhesive and the like.

In another embodiment, the subject technology is directed to a swivel knife holder assembly for a reciprocating knife including a shoulder screw defining an axis, the shoulder screw having a proximal threaded end and a distal head and a bobbin assembly mounted on the shoulder screw to freely swivel for absorbing axial load, wherein the bobbin assembly comprises a thrust bearing adjacent the distal head, a spacer for guiding the thrust bearing rotation, and a shock-absorbing member adjacent the spacer for absorbing axial load. A shell defines an interior and has a distal opening and a proximal opening, wherein the proximal opening is defined by a flange. The shell is configured to engage a rotating drive mechanism to swivel about the axis. A stem threadably couples to the proximal threaded end of the shoulder screw to enclose the interior. The stem also has a mounting surface for engaging a reciprocating drive mechanism. A core mounts in the interior for holding the knife and rotating with the shell.

In still another embodiment, the subject technology is directed to a swivel knife holder assembly for a reciprocating knife with the holder assembly comprising a shell defining an interior with a distal opening and a proximal opening. The shell has a flange segmenting the interior into a distal pocket and a proximal pocket. A shoulder screw extends from the distal pocket to the proximal pocket along an axis. A first bobbin assembly mounts on the shoulder screw adjacent a head of the shoulder screw in the distal pocket and a second bobbin assembly mounts on the shoulder screw in the proximal pocket. Each bobbin assembly includes a thrust bearing/spacer assembly for rotating about the axis within the respective pocket. At least one shock-absorbing member absorbs axial load and axial tolerances in at least one of the pockets. A stem threadably couples to a threaded end of the shoulder screw to enclose the proximal pocket and apply axial compression to the shock-absorbing member. The stem also has a mounting surface for engaging a reciprocating axial drive mechanism. A core mounts in the distal pocket for enclosing the distal pocket and holding the knife. A rotating drive mechanism swivels the shell so that the core swivels about the axis and, in turn, the knife swivels to a desired orientation.

Preferably, the shell has a relatively square cross-sectional shape with flat corner to match a complimentarily shaped shell holder of the drive mechanism for version control. In other words, the shell holder of the drive mechanism has an interior that is substantially square except for an angled corner so that older, out-of-date square shells cannot be mounted thereon. The single flat corner arrangement also sets the orientation of the shell in the holder if needed. It is envisioned that many similar structures or keying features can accomplish the same function. Similarly, the core can include a transverse pin so that only a matching angled corner knife may be mounted therein for version control. The shock-absorbing member may be one or more of a wave washer, coil spring, polymer disc, a rubber ring, a leaf spring, and combinations thereof.

It will be appreciated that the thrust bearings of the disclosure decrease the backlash within the swivel joint and therefore reduce overall noise and wear. Moreover, the thrust bearings of the disclosure do not require heat treatment or a nitride coating, and therefore last longer while being less costly to manufacture. It will also be appreciated that the spacers have an inner circular base for housing of the thrust bearings, thereby allowing for rotational movement about a radial axis of rotation when under compressive force. Furthermore, the shock-absorbing member absorbs axial compression and reduces overall load. Nitride coatings for swivel assemblies may be costly, therefore it will be further appreciated that the disclosure reduces manufacturing costs as shock-absorbing members, thrust bearings, and spacers are inexpensive and easily manufactured.

BRIEF DESCRIPTION OF THE DRAWINGS

The accompanying drawings, referred to herein and constituting a part hereof, illustrate a preferred embodiment of the disclosure and, together with the description, serve to explain the principles of the disclosure.

DETAILED DESCRIPTION

Figure 1:
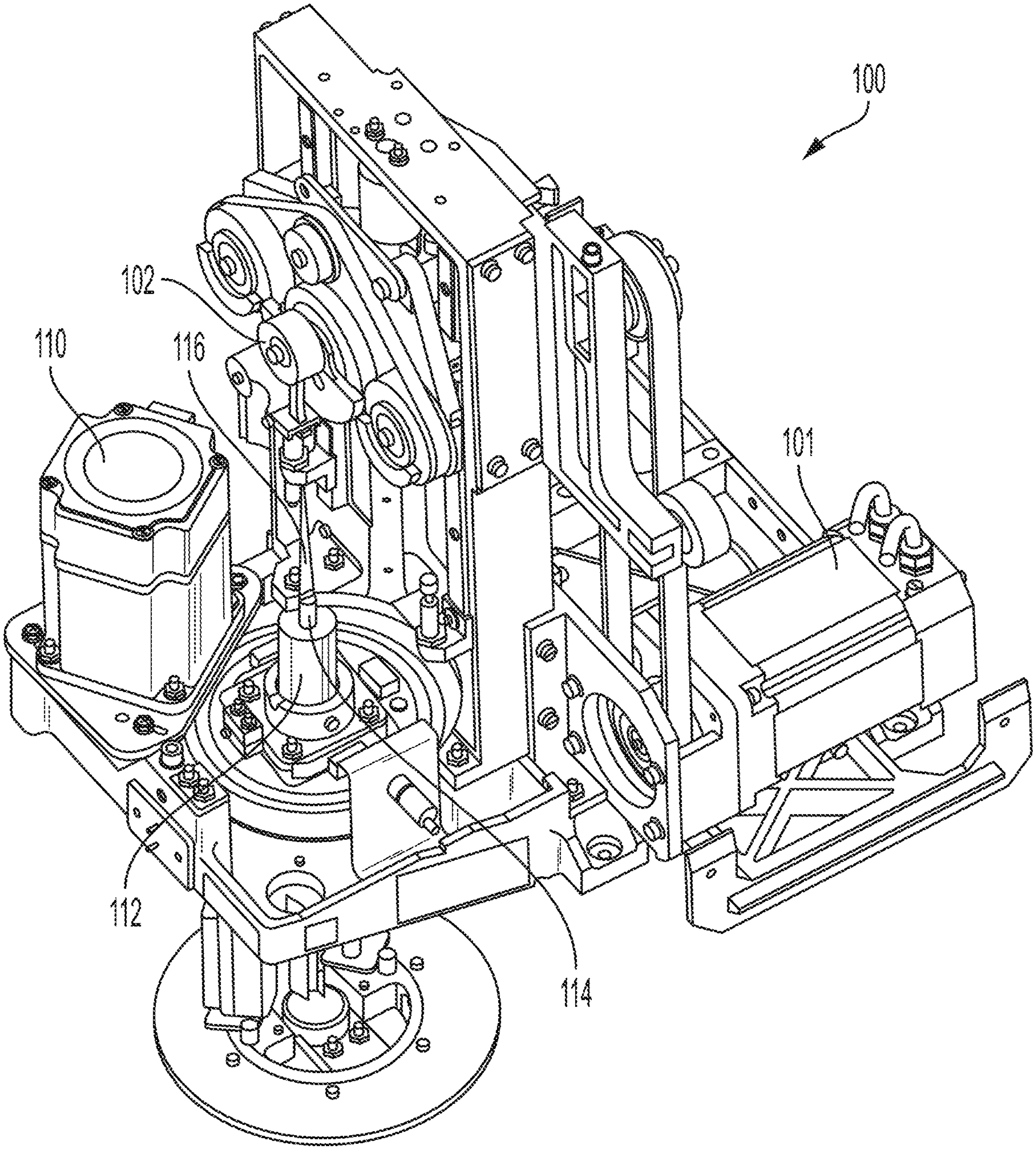
FIG. 1 illustrates a CNC multi-ply cutting machine using a reciprocated knife as a cutting tool for cutting garment parts from multi-ply fabrics in accordance with the subject disclosure.

The advantages, and other features of the method disclosed herein, will become more readily apparent to those having ordinary skill in the art from the following detailed description of certain preferred embodiments taken in conjunction with the drawings, which set forth representative embodiments of the present disclosure and wherein like reference numerals identify similar structural elements. It is understood that references to the figures such as up, down, upward, downward, left, and right are with respect to the figures and not meant in a limiting sense.

Figure 2:
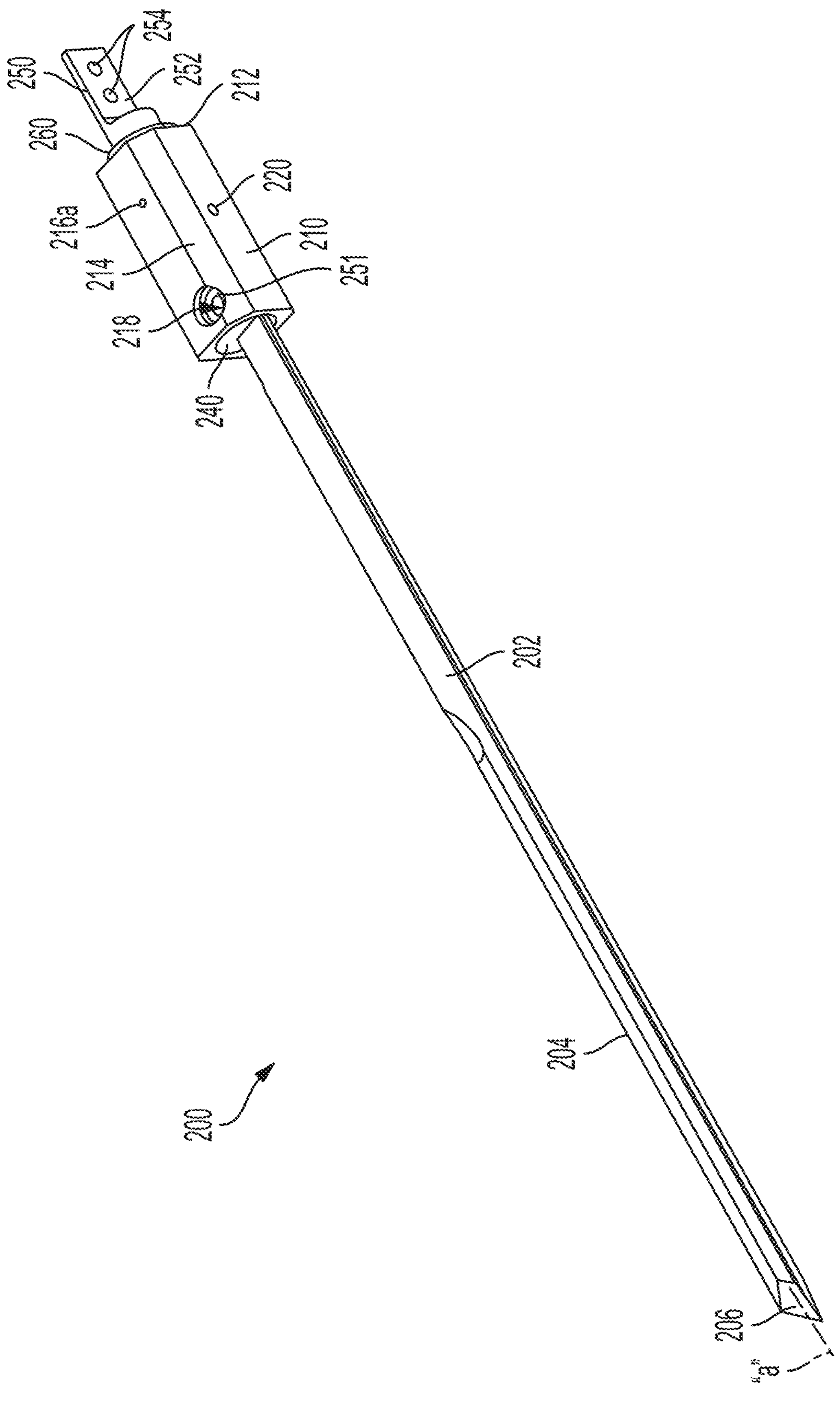
FIG. 2 illustrates the exterior of a swivel knife holder assembly for a reciprocated knife in accordance with the subject disclosure.
Figure 3:
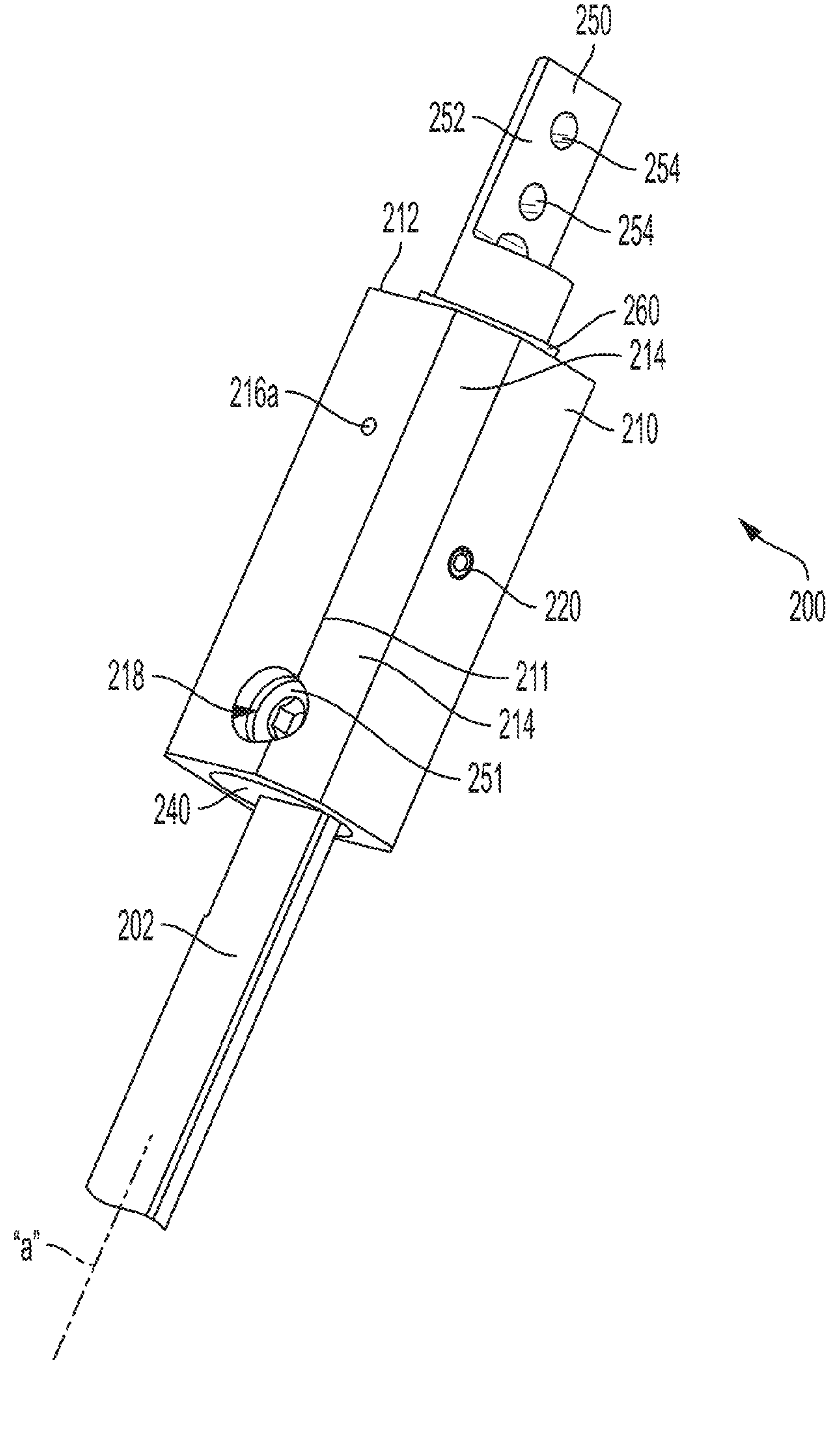
FIG. 3 illustrates a magnified perspective view of the swivel knife holder assembly of FIG. 2.

FIGS. 2 and 3 illustrate the exterior of a swivel knife holder assembly 200 for a reciprocated knife 202 in accordance with a preferred embodiment of the disclosure. The knife 202 extends distally from a shell 210 by coupling to a core 240 that is retained in the shell 210. The knife 202 has a sharpened edge 204 and point 206. The swivel knife holder assembly 200 includes a stem 250 extending from a proximal end 212 of the shell 210. The shell 210 is configured to fit within a cutter tube of a CNC multi-ply cutting machine 100 as shown in FIG. 1. The stem 250 includes a mounting surface 252 with holes 254 for engaging a reciprocating drive mechanism configured to reciprocate the swivel knife holder assembly 200 along axis "a".

The shell 210 includes a prominent flat 214 that preferably compliments the cutter tube so that a generally square swivel assembly can fit in the same CNC multi-ply cutting machine 100. The shell 210 defines grease ports 216*a* (only one grease port shown) and throughbores 218, 220 as described below. The shell 210 may be fabricated from hardened alloy steel, for example AISI 4140, to provide wear resistant surfaces for sliding against the inside of the cutter tube 112. The core 240 is preferably fabricated from hardened aluminum, such as alloy temper 7075-T6. It will also be appreciated by those skilled in the art that an aluminum core causes the knife holder assembly 200 to have a smaller mass than that of the solid steel core used in the prior art, thereby aiding in the reduction of overall noise. Those skilled in the art will appreciate that the shell 210, core 240 and other components may be fabricated from other materials, including plastic, provided stress limits, bearing pressure, and velocity limits are suitable for the application. Those skilled in the art will recognize other suitable fastening methods including adhesive bonding, welding, other threaded fasteners can be used to secure the core in place.

Figure 4:
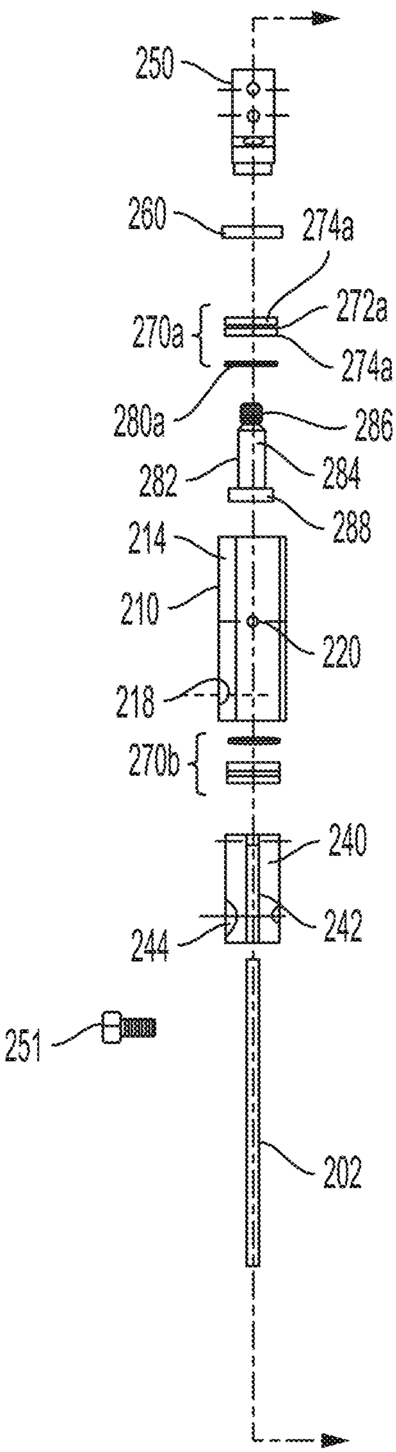
FIG. 4 illustrates an exploded view of the swivel knife holder assembly of FIG. 2.
Figure 5:
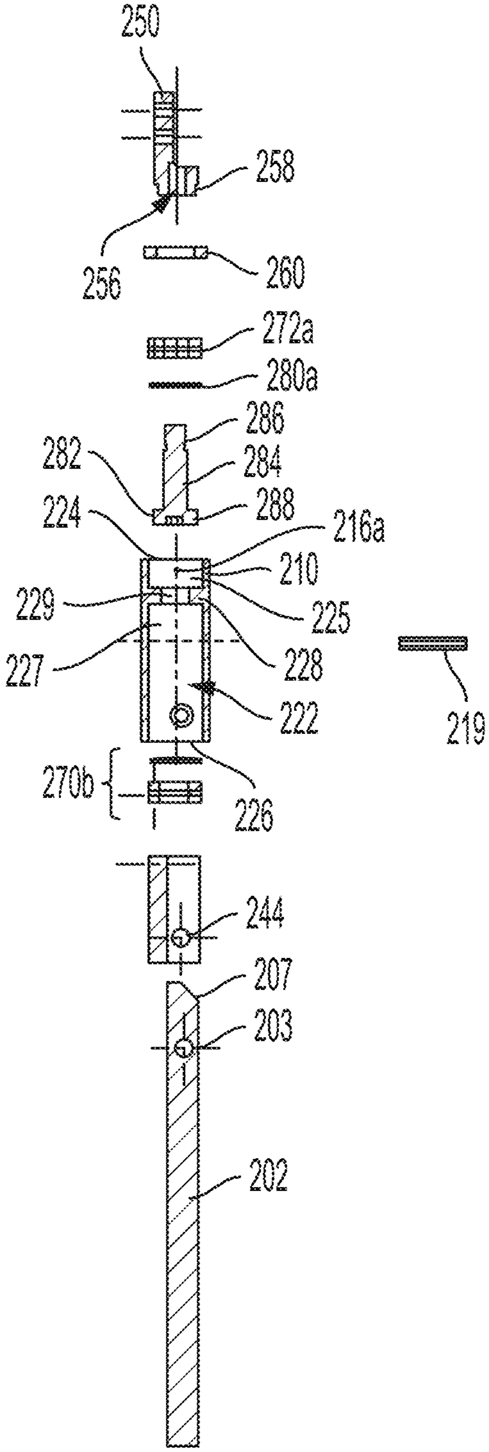
FIG. 5 illustrates a cross-sectional exploded view taken along cut line A-A of the swivel knife holder assembly of FIG. 4.
Figure 10A:
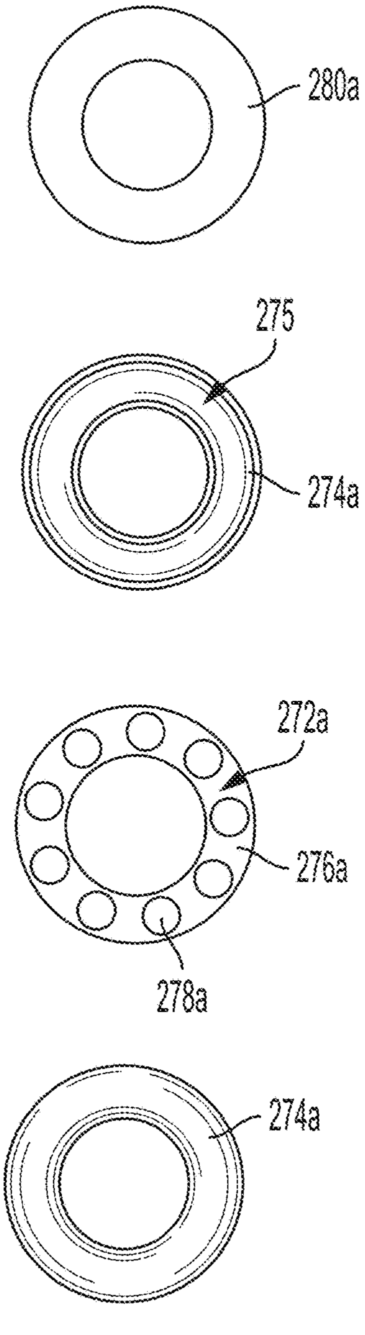
FIG. 10A illustrates a plan view of components of a bobbin assembly of the swivel knife holder assembly of FIG. 2.
Figure 10B:
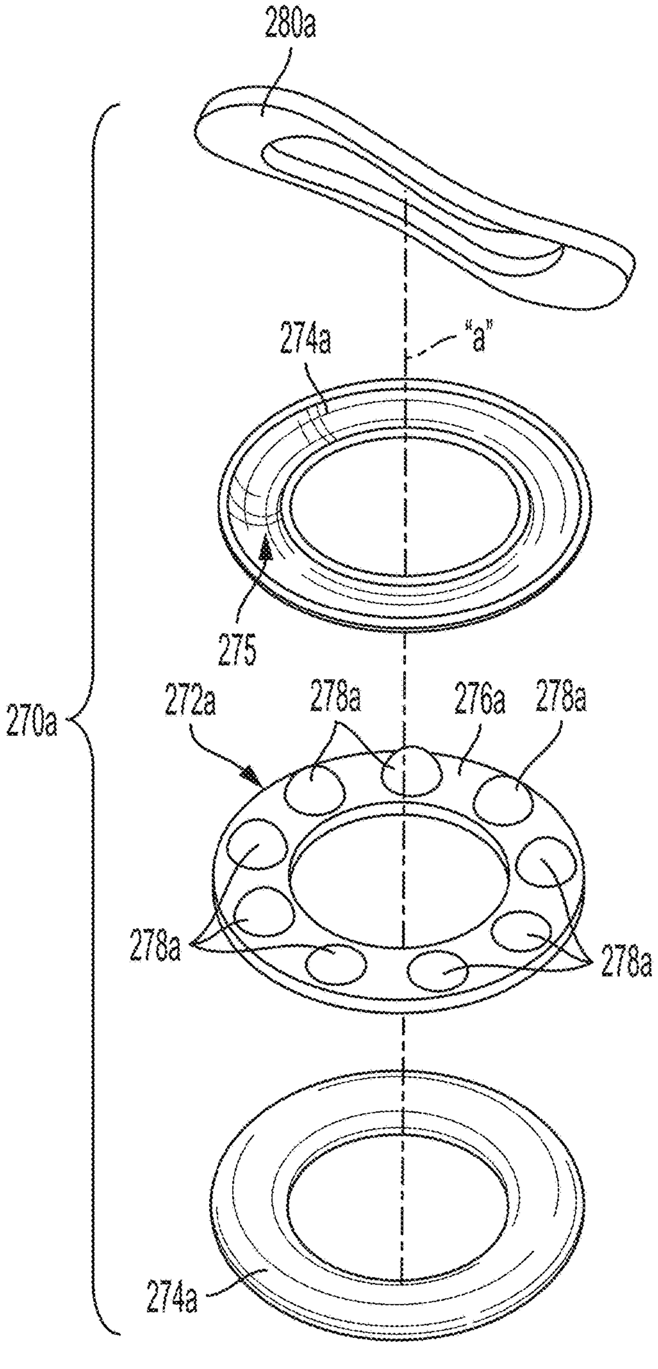
FIG. 10B illustrates a perspective view of components of a bobbin assembly of the swivel knife holder assembly of FIG. 2.

An exploded view of the swivel knife holder assembly 200 is illustrated in FIG. 4 and a cross-sectional exploded view taken along cut line A-A of the swivel knife holder assembly of FIG. 4 is illustrated in FIG. 5. The stem 250 defines a central threaded axial bore 256 and a necked down distal end 258 for accommodating an optional washer 260. Preferably, the washer 260 is elastomer. The swivel knife holder assembly 200 also includes a first bobbin assembly 270*a*, also shown in FIGS. 10A and 10B. Referring briefly to FIGS. 10A and 10B, the first bobbin assembly 270*a* includes a thrust bearing 272*a* sandwiched between spacers 274*a*. The thrust bearing 272*a* includes a ring 276*a* holding a plurality of bearings 278*a* for rotation. Each spacer 274*a* forms a circular channel or race 275 so that the spacers 274*a* freely rotate on the thrust bearing 272*a*. The first bobbin assembly 270*a* also includes a wave washer 280*a* to absorb axial loads. It will be appreciated that any shock-absorbing member currently known or used in the art may be used, including, but not limited to, a coil spring, rubber ring, or polymer disc. FIG. 10A further illustrates two spacers 274*a* having an inner circular track about the circumference of each spacer. As previously stated, depending on the embodiment of the shoulder screw, only one spacer is necessary. FIG. 10A and FIG. 10B illustrate a thrust bearing 278*a*. The thrust bearing is preferably an antifriction bearing having rolling elements for coupling to a spacer. The rolling elements of the thrust bearing may include, but are not limited to, balls, cylindrical needles, or tapered pins. Preferably, the spacers 274*a* are identical for ease of manufacture but the spacers do not need to be. Indeed, even only a single spacer may be used in each bobbin assembly. Alternatively, only one or neither of the spacer may form a race or have the race facing the thrust bearing.

Figure 6:
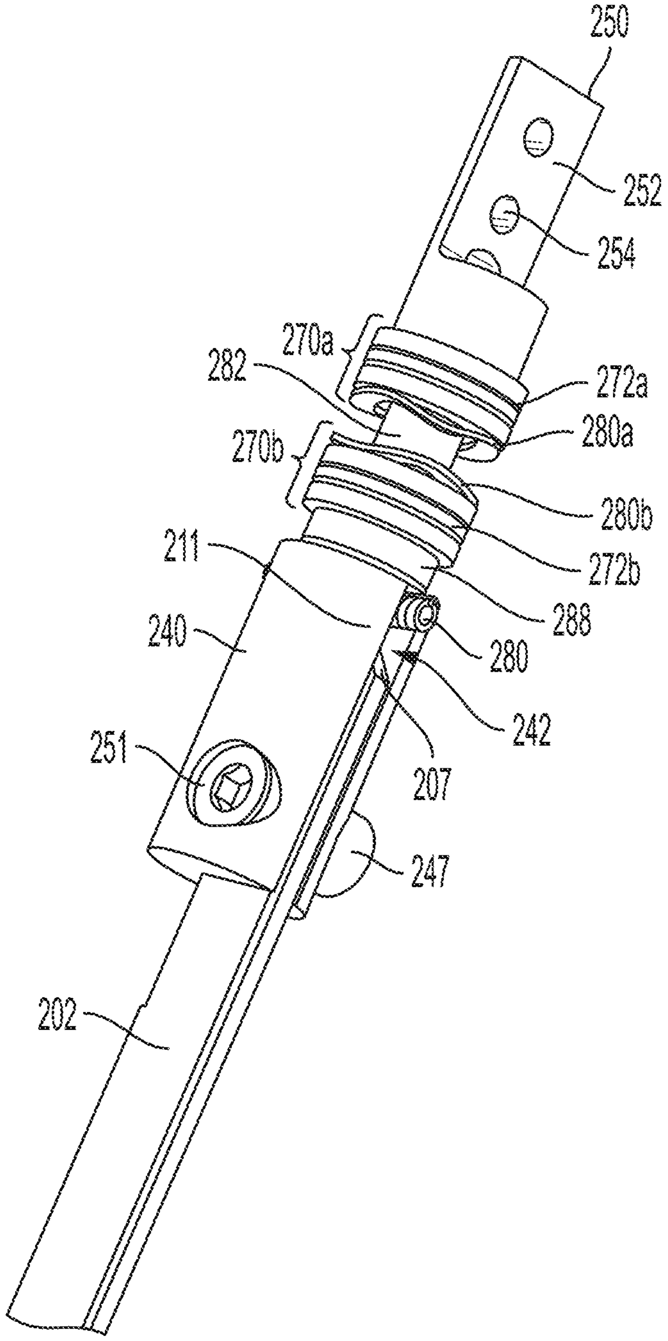
FIG. 6 shows a perspective view of the interior assembly of the swivel knife holder assembly of FIG. 2.
Figure 7:
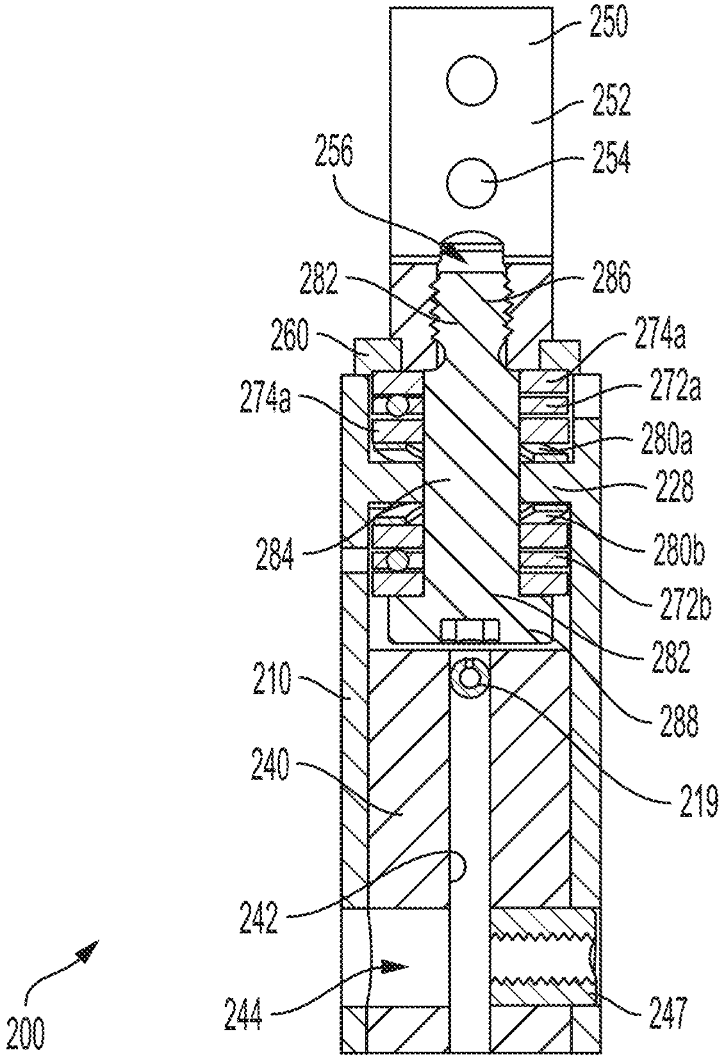
FIG. 7 illustrates a cross-sectional exploded view of the swivel knife holder assembly of FIG. 2.

Referring back to FIGS. 4 and 5, the swivel knife holder assembly 200 includes a second bobbin assembly 270*b* that has the same components as the first bobbin assembly 270*a*. The swivel knife holder assembly 200 also includes a shoulder screw 282 having a shoulder portion 284 and a threaded end 286 extending from a head 288. As best seen in FIGS. 6 and 7, the two bobbin assemblies 270*a*, 270*b* mount on the shoulder screw 282.

Still referring to FIGS. 4 and 5, the shell 210 defines an interior 222 having a proximal opening 224 and a distal opening 226. The interior 222 is divided into two pockets 225, 227 by an inner flange 228, which forms an intermediate opening 229. The proximal pocket 225 is enclosed by the washer 260 and stem 250 while the distal pocket 227 is enclosed by the core 240. As best seen in FIGS. 2 and 5, the first grease port 216*a* is in fluid communication with the proximal pocket 225 and a second grease port (not shown) is in fluid communication with the distal pocket 227.

As noted above, the cylindrically shaped core 240 slides snugly into the distal pocket 227 of the interior 222. The core 240 includes a radial slot 242, deep enough to house the knife 202 therein. The core 240 further includes a cross-drilled bore 244 perpendicular to the radial slot 242. The cross-drilled bore 244 runs through the core 240. As best seen in FIG. 7, the bore 244 has a threaded insert 247 for mating with the screw 251. Thus, when the bore 244 is aligned with the throughbore 218 of the shell 210, a screw 251 can be received therein.

Figure 11A:
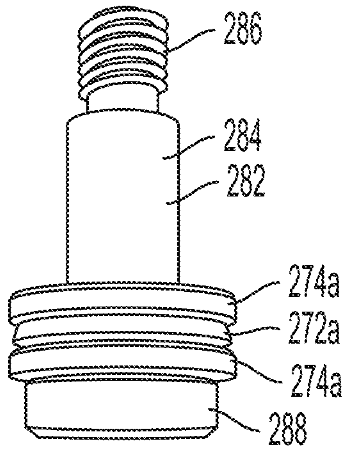
FIG. 11A illustrates a possible first assembly step for the components of the swivel knife holder assembly of FIG. 2.
Figure 11B:
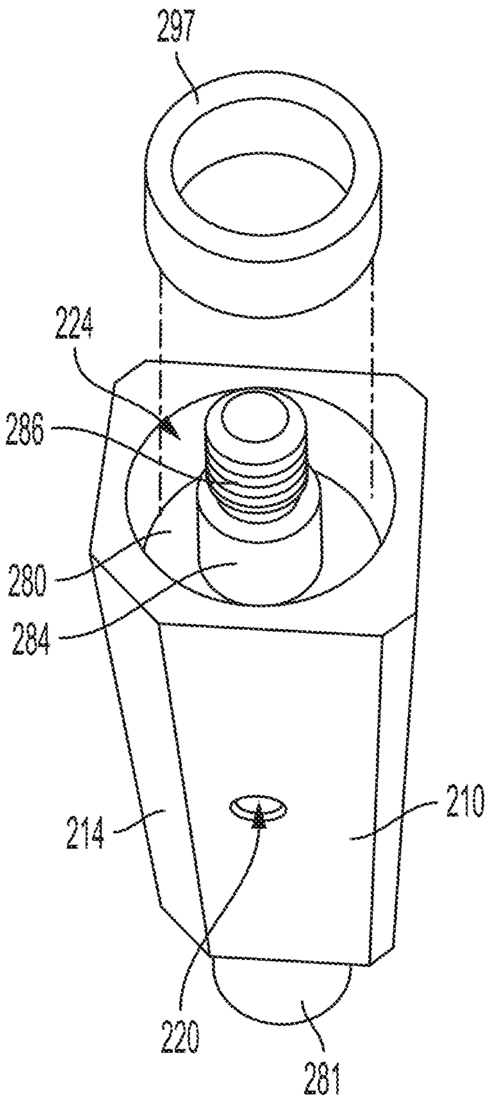
FIG. 11B illustrates a possible second assembly step for the components of the swivel knife holder assembly of FIG. 2.
Figure 11C:
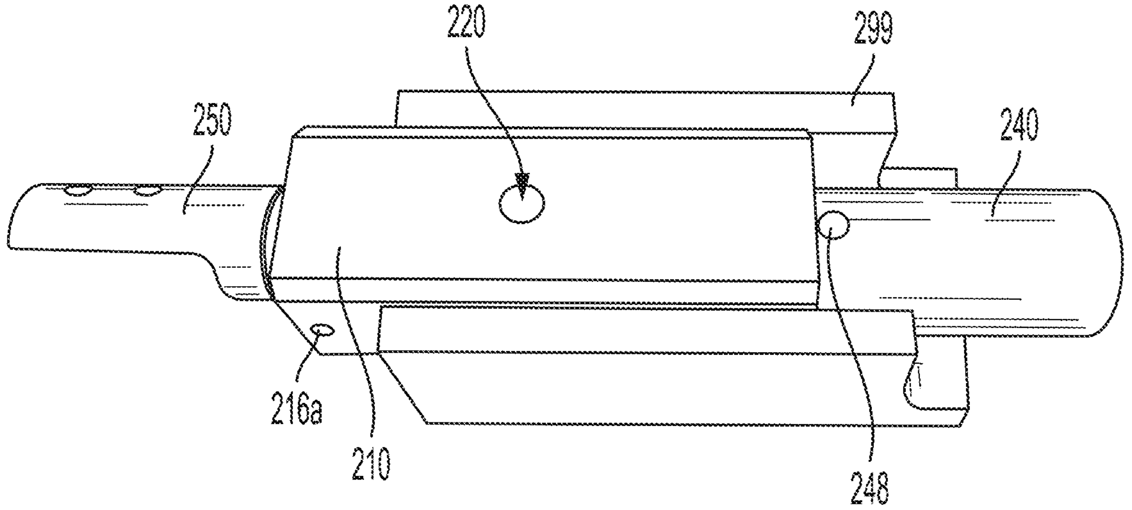
FIG. 11C illustrates a possible third assembly step for the components of the swivel knife holder assembly of FIG. 2.

The core 240 also defines a transverse pinhole 248 (best seen in FIG. 11C). The pinhole 248 aligns with the throughbore 218 of the shell 210 to receive a roll-pin 219 that fixes the core 240 in the distal pocket 227. The core 240 is further secured within the shell 210 by the screw 251. It will be appreciated that the knife 202 includes a bore 203 (see FIGS. 4 and 5) for receiving the screw 251 to secure the knife 202 within the swivel knife holder assembly 200. In another embodiment, the shell and/or core receive a second roll-pin in an area 211 (see FIGS. 3 and 5) for additional support and/or so that only a knife with a proximal angled top 207 fits into the core.

FIG. 6 shows a perspective view of the interior components of the swivel knife holder assembly 200 in accordance with an embodiment of the disclosure, wherein the interior components discussed above are assembled for illustration. Specifically, FIG. 6 illustrates the shoulder screw 282 having a second bobbin assembly 270*b* mounted thereon and abutting the head 288 of the shoulder screw 282. The shoulder screw 282 also has the first bobbin assembly 270*a* mounted thereon and secured by the stem 250, threadably fastened thereon. Adjacent the head 288 of the shoulder screw 282 is the core 240. As detailed above, the core 240 includes a radial slot 242 having a roll-pin 219 therein for securing the core 240 to the shell 210 when the core is inserted therein. FIG. 6 further illustrates the knife 202 secured within the radial slot 242 of the core 240. When the knife 202 is inserted into the radial slot 242, a proximal end 209 of the knife 202 abuts the roll-pin 219 so that the knife 202 protrudes outwardly from the core 240. FIG. 6 illustrates the screw 251 inserted into and through the bore 218 of the core 240 and knife 202, thereby securing the knife 202 within the core 240. It will be appreciated that the screw 251 maintains the position of the knife 202, thereby preventing any misalignment during reciprocation and rotation. In still another embodiment, another roll-pin is only inserted into the core so that only a knife with an angled corner can fit into the core.

FIG. 7 illustrates a cross-sectional view of the swivel knife holder assembly 200 fully assembled in accordance with an embodiment of the disclosure. When rotational force is applied to the shell 210 by the theta drive, the shell 210, the core 240 and the knife 202, which are all coupled together, freely rotate to position the knife 202 in the desired orientation while the stem 250 and shoulder screw 282, which are coupled together, do not rotate about the axis "a". The thrust bearings 272*a*, 272*b* of the bobbin assemblies 270*a*, 270*b* facilitate this rotation without binding despite the axial tolerances of the bobbin assemblies 270*a*, 270*b* in the pockets 225, 227 being filled by the wave washers 280*a*, 280*b*. Thus, when rotational force is applied to the shell 210 by the theta drive, the knife 202 freely rotates. The bobbin assemblies 270*a*, 270*b* also absorb the axial load on the swivel assembly 200 during reciprocating motion by further compression.

As can be seen, the bobbin assemblies of the swivel knife holder assembly in accordance with the present disclosure increase the longevity of the swivel knife holder assembly by threefold compared to prior art devices. Specifically, the shock-absorbing members (e.g., wave washers) of the bobbin assemblies absorb axial compression, thereby reducing the overall wear and tear of the bobbin assembly. The absorption of axial compression also reduces the level of noise output by softening the impact of the bobbin assemblies against the flange and shell of the swivel knife holder assembly. Moreover, the thrust bearings allow for rotation of the interior assembly of the swivel knife holder assembly about the axis of rotation despite the amount of compression applied to the bobbin assemblies. The flange prevents the shoulder screw from exiting the shell in response to an upward force, and the stem prevents the shoulder screw from exiting the shell in response to a downward force. In short, the use of the bobbin assemblies reduces noise output and overall wear and tear.

The thrust bearings are preferably preloaded by a compressive force applied by the shoulder screw. The preload is preferably within the range of 80-120 lbs. The preload is governed by the displacement of the at least one shock-absorbing member, and preferably exceeds the inertial force associated with the reciprocation of the swivel knife holder assembly and knife to assure zero clearance between the thrust bearing surfaces of the first and second bobbin assemblies. It will be appreciated that at least one shock-absorbing member is sufficient for causing the preload, but that the presence of a shock-absorbing member in each bobbin limits the inertial force shock in both the upward and downward. It will be further appreciated that the swivel knife holder assembly in accordance with the present disclosure significantly reduces manufacturing costs. The elements used in the bobbin assemblies of the swivel knife holder assembly are inexpensive and easily replaceable, thus, reducing costs for production of the same. It is envisioned that the shock absorbing members can be selected from the group consisting of split washers, coil springs, leaf springs, elastic or rubber elements and the like as well as combinations thereof.

Figure 8:
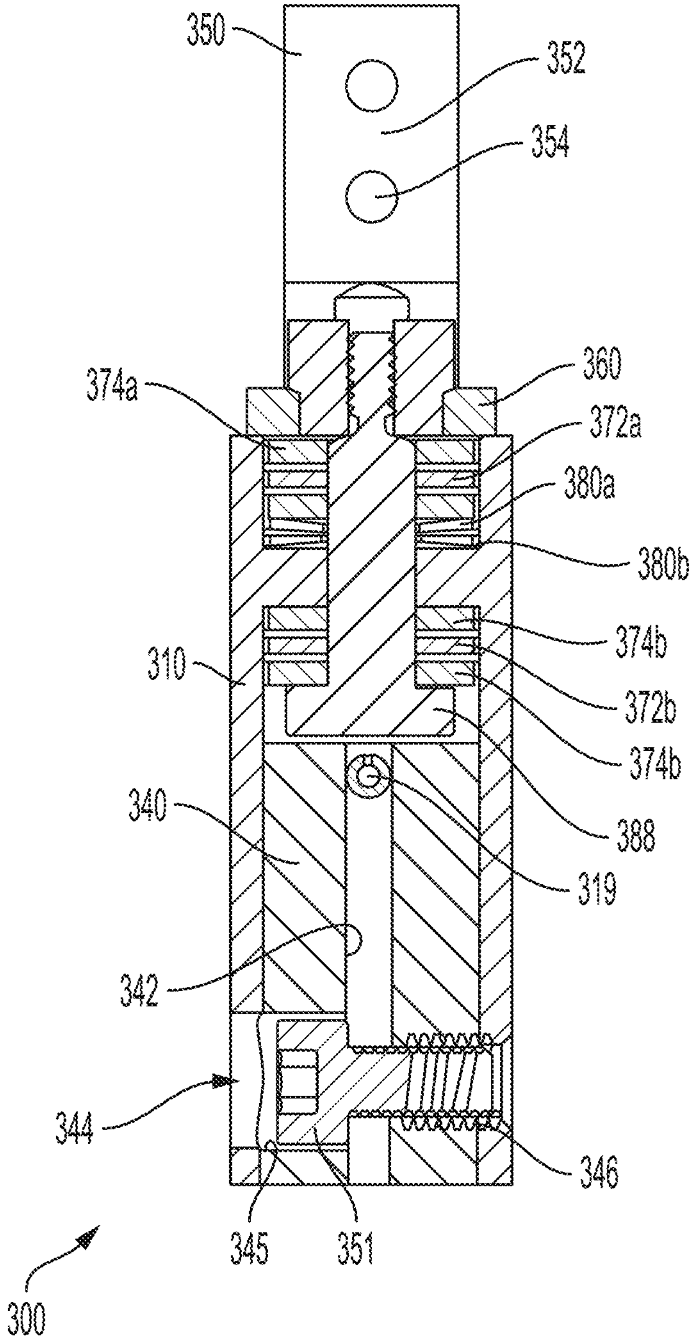
FIG. 8 illustrates a cross-sectional exploded view of another swivel knife holder assembly in accordance with the subject disclosure.

It will be appreciated by those having skill in the art that the swivel knife holder assembly does not require a shock-absorbing member in each bobbin assembly. In the alternative embodiment illustrated in FIG. 8, three hundred series numbers are used but like references numbers are used to indicate similar elements wherever possible. The two shock-absorbing members 380 are located in the first bobbin assembly 370*a*, and no shock-absorbing members are located in the second bobbin assembly 370*b*. Although two shock-absorbing members 380 are seen in the second bobbin assembly of FIG. 8, it will be appreciated that only one shock-absorbing member is necessary. It is also noted that bore 344 defines an initial relatively larger unthreaded portion 345 and smaller threaded portion 346.

Figure 9:
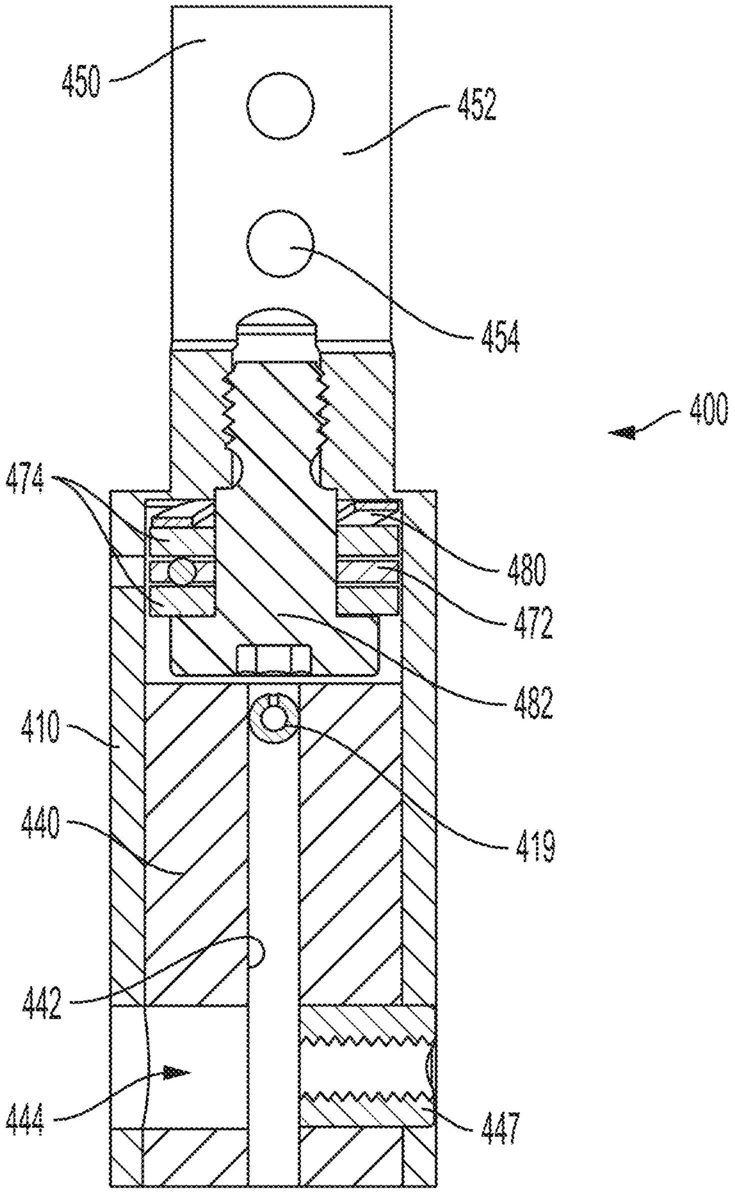
FIG. 9 illustrates a cross-sectional exploded view of still another swivel knife holder assembly in accordance with the subject disclosure.

Furthermore, the swivel knife holder assembly is not limited to any number of bobbin assemblies. As seen in the alternative embodiment illustrated in FIG. 9, four hundred series numbers are used but like references numbers are used to indicate similar elements wherever possible. The intermediate opening in the interior 422 of the shell 410 is omitted and only a single bobbin assembly is present. In this embodiment, the flange 428 of the shell 410 at the proximal opening 424 provides structure against which the shock-absorbing member 480 of the single bobbin assembly 470 compresses. As only a single bobbin assembly 470 exists, the threaded end 486 of the shoulder screw 482 protrudes outwardly from the proximal opening of the shell 410, and the stem 450 is threadably fastened thereon to secure the single bobbin assembly 470 within the shell 410. As detailed above, only a single shock-absorbing member 480 is necessary, but additional shock-absorbing members may be used to further distribute absorption of the axial load from reciprocating.

FIGS. 11A-11D illustrate possible assembly steps for the components of the swivel knife holder assembly of FIG. 7. FIG. 11A illustrates a first step of placing the second bobbin assembly 270*b* on the shoulder screw 282 of the swivel knife holder assembly 200. The second bobbin assembly 270*b* may be preassembled and placed on the shoulder screw 282. Preferably, at least one of the spacers 274*a* is a tight fit with the thrust bearing 272*a* so that a light press is required. Alternatively when the bobbin assembly is not preassembled, the first spacer 274*a* is mounted on the shoulder screw, resting against the head 288 of the shoulder screw 282. Next, the thrust bearing 272*a* is mounted on the shoulder screw 282 atop the first spacer 274*a*, and a second spacer 274*a* is mounted thereon. The spacers 274*a* and thrust bearing 272*a* are mounted such that rolling elements 278 of the thrust bearing 272*a* are coupled to the inner circular race 275 of the spacers 274*a*. At this point, the shoulder screw 282 with first bobbin assembly 270*a* can be placed in the distal pocket 227 with the threaded end 286 extending through the intermediate opening 229 of the flange 228.

FIG. 11B illustrates another step in which the swivel gauge assembly 200 is measured to check if a shim is necessary. The shoulder screw 282 is supported firmly in place with a solid dowel 281. With the second bobbin assembly 270*b* in place and the two wave washers 280*a*, 280*b* on the shoulder screw 282, a precision calibration spacer 297 is placed on the two wave washers 280*a*, 280*b*. The precision calibration spacer 297 should be flush with the proximal end surface 231 of the shell 210 to indicate that a proper amount of compression will be applied with mounting the stem 250. If not flush, one or more shims, such as a thin washer, can be added on to the shoulder screw 282 until within tolerance. Once ready, the spacers 274 and thrust bearing 272 are put in place, the stem 250 can be tightly secured to the threaded end 286 of the shoulder screw 282 with a screw adhesive.

Figure 11D:
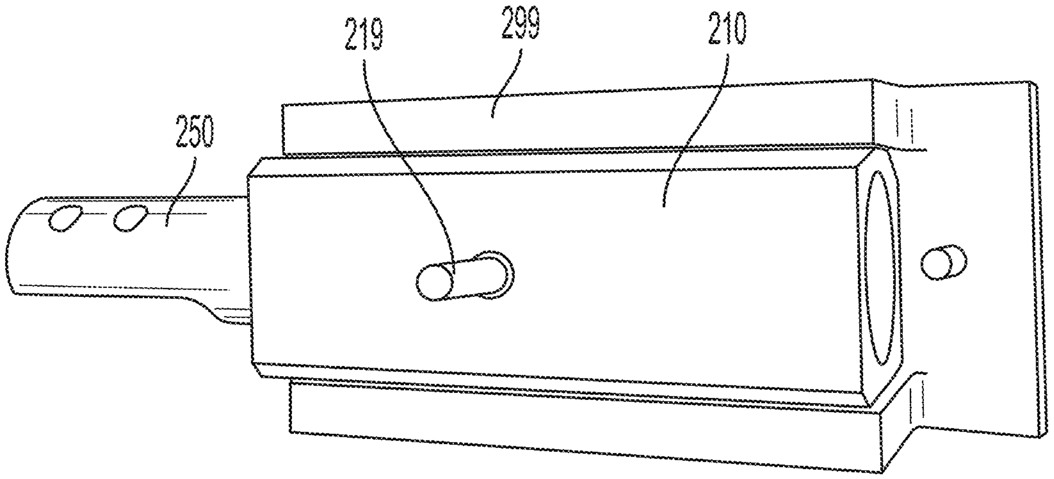
FIG. 11D illustrates a possible fourth assembly step for the components of the swivel knife holder assembly of FIG. 2.

In FIG. 11C, the core 240 is placed into the distal pocket 227 of the interior 222 of the shell 210 so that the through-bore 220 and pinhole 248 align. A jig 299 is used to hold the shell 210 steady and a piece of cardboard or like element can be placed in the radial slot 242 to rotate the core 240 as needed. As shown in FIG. 11D, once the core 240 is in position, the roll-pin 219 is pressed into place. Screw adhesive may be added to the pinhole 248 to help secure the roll-pin 219. At such time, the grease ports 216*a* can be used to lubricate the pockets 225, 227. Lastly, typically at the garment factory, a knife 202 can be mounted in the swivel knife assembly 200 in preparation for installment in the cutter tube of the machine.

It will be appreciated by those of ordinary skill in the pertinent art that the functions of several elements (e.g., washers, spacers, pins, screws and the like) may, in alternative embodiments, be carried out by fewer elements, or a single element. Similarly, in some embodiments, any functional element may perform fewer, or different, operations than those described with respect to the illustrated embodiment.

While the subject technology has been described with respect to preferred embodiments, those skilled in the art will readily appreciate that various changes and/or modifications can be made to the subject technology without departing from the spirit or scope of the subject disclosure. The appended claims are exemplary and may be combined and arranged in any manner including with multiple dependencies and the like.

What is claimed is:

1. A knife holder assembly comprising:

a shoulder screw defining an axis, the shoulder screw having a proximal threaded end and a distal head;

a bobbin assembly on the shoulder screw, the bobbin assembly having a thrust bearing adjacent the distal head, a spacer for guiding the thrust bearing rotation, and a shock-absorbing member adjacent the spacer;

a shell defining an interior, the shell having a distal opening and a proximal opening, wherein the proximal opening is defined by a flange and houses the shoulder screw;

a stem threadably coupled to the proximal threaded end of the shoulder screw, the stem having a mounting surface for engaging a reciprocating drive mechanism; and a core secured in the interior for coupling to a knife.

2. The knife holder assembly according to claim 1, wherein the thrust bearing is pre-loaded with a compressive force applied by the flange by displacing the at least one shock-absorbing member.

3. The knife holder assembly according to claim 2, wherein the compressive force exceeds an inertial force associated with a reciprocation of the knife.

4. The knife holder assembly according to claim 1, wherein the shock-absorbing member is selected from the group consisting of: a wave washer: coil spring; polymer disc; a rubber ring, a leaf spring, and combinations thereof.

5. The knife holder assembly according to claim 1, wherein the thrust bearing is an anti-friction bearing having rolling elements, and the rolling elements comprise at least one of a ball, cylindrical needle, and tapered pin.

6. The knife holder assembly according to claim 1, wherein the flange segments the interior creating a first segment between the distal head of the shoulder screw and the flange, and a second segment between the flange and the base of the stem with the bobbin assembly in the first pocket and a second bobbin assembly in the second pocket.

7. The knife holder assembly according to claim 1, wherein the shell includes a grease port for providing a lubricant to the interior and the core is secured to the shell by a pin.

8. A swivel knife holder assembly for a reciprocating knife, the holder comprising:

a shoulder screw defining an axis, the shoulder screw having a proximal threaded end and a distal head;

a bobbin assembly mounted on the shoulder screw to freely swivel for absorbing axial load, wherein the bobbin assembly comprises a thrust bearing adjacent the distal head, a spacer for guiding the thrust bearing rotation, and a shock-absorbing member adjacent the spacer for absorbing axial load;

a shell defining an interior, the shell having a distal opening and a proximal opening, wherein the proximal opening is defined by a flange, wherein the shell engages a rotating drive mechanism to swivel about the axis;

a stem threadably coupled to the proximal threaded end of the shoulder screw, the stem having a mounting surface for engaging a reciprocating drive mechanism; and a core secured in the interior for coupling to the knife.

9. The swivel knife holder assembly according to claim 8, wherein thrust bearing is pre-loaded with a compressive force applied to the shock-absorbing member and the compressive force exceeds force generated by reciprocation of the knife.

10. The swivel knife holder assembly according to claim 8, wherein the shock-absorbing member is a wave washer and the thrust bearing is an anti-friction bearing having a plurality of bearing balls.

11. A swivel knife holder assembly for a reciprocating knife, the holder assembly comprising:

a shell defining an interior with a distal opening and a proximal opening, the shell having a flange segmenting the interior into a distal pocket and a proximal pocket;

a shoulder screw extending from the distal pocket to the proximal pocket along an axis;

a first bobbin assembly mounted on the shoulder screw adjacent a head of the shoulder screw in the distal pocket;

a second bobbin assembly mounted on the shoulder screw in the proximal pocket, wherein each bobbin assembly includes a thrust bearing/spacer assembly for rotating about the axis within the respective pocket;

a shock-absorbing member for absorbing axial load and axial tolerances in at least one of the pockets;

a stem threadably coupled to a threaded end of the shoulder screw to enclose the proximal pocket and apply axial compression to the shock-absorbing member, wherein the stem has a mounting surface for engaging a reciprocating axial drive mechanism; and a core mounted in the distal pocket for enclosing the distal pocket and holding the knife, wherein the shell engages a rotating drive mechanism to swivel the core about the axis and, in turn, the knife to a desired orientation.

12. The swivel knife holder assembly according to claim 11, wherein the shell has a relatively square cross-sectional shape with flat corner to match a complimentarily shaped shell holder of the drive mechanism for version control.

13. The swivel knife holder assembly according to claim 11, wherein the core includes a transverse pin to match an angled corner of the knife for version control.

14. The swivel knife holder assembly according to claim 11, wherein the shock-absorbing member is selected from the group consisting of: a wave washer; coil spring; polymer disc; a rubber ring; a leaf spring; and combinations thereof.

* * * * *